(12) United States Patent
Usui et al.

(10) Patent No.: US 7,279,095 B2
(45) Date of Patent: Oct. 9, 2007

(54) FUEL SUPPLY DEVICE

(75) Inventors: Takayuki Usui, Obu (JP); Yoshiyuki Kasai, Obu (JP); Kunio Takagi, Obu (JP)

(73) Assignee: Aisan Kogyo Kabushiki Kaisha, Aichi-ken (JP)

( * ) Notice: Subject to any disclaimer, the term of this patent is extended or adjusted under 35 U.S.C. 154(b) by 201 days.

(21) Appl. No.: 11/111,921

(22) Filed: Apr. 22, 2005

(65) Prior Publication Data

US 2005/0236321 A1    Oct. 27, 2005

(30) Foreign Application Priority Data

Apr. 23, 2004    (JP) ............................. 2004-128951

(51) Int. Cl.
*B01D 35/02* (2006.01)
*F02M 37/22* (2006.01)

(52) U.S. Cl. .................... 210/232; 210/416.4; 210/489

(58) Field of Classification Search ................ 210/232, 210/416.1, 416.4, 488, 489
See application file for complete search history.

(56) References Cited

U.S. PATENT DOCUMENTS

| | | | | |
|---|---|---|---|---|
| 4,783,260 A | * | 11/1988 | Kurihara | ...................... 210/232 |
| 5,547,568 A | * | 8/1996 | Sasaki | ......................... 210/172 |
| 5,647,329 A | * | 7/1997 | Bucci et al. | ................. 123/509 |
| 6,220,454 B1 | * | 4/2001 | Chilton | ....................... 210/483 |
| 6,471,072 B1 | * | 10/2002 | Rickle et al. | ................ 210/486 |
| 2002/0017485 A1 | * | 2/2002 | Ito et al. | .................... 210/416.4 |
| 2002/0081211 A1 | | 6/2002 | Benghezal et al. | |
| 2003/0000503 A1 | | 1/2003 | Takahashi | |
| 2004/0129626 A1 | * | 7/2004 | Fischer et al. | ............ 210/416.4 |

FOREIGN PATENT DOCUMENTS

| | | |
|---|---|---|
| DE | 19905969 | 8/2000 |
| EP | 0422800 | 8/1993 |
| EP | 1001158 | 2/2000 |
| JP | 200042314 | 2/2000 |
| JP | 2003028019 | 1/2003 |

* cited by examiner

*Primary Examiner*—Fred G. Prince
(74) *Attorney, Agent, or Firm*—Dennison, Schultz & MacDonald

(57) ABSTRACT

Fuel supply device (10) may comprise fuel pump (20) and suction filter (40) attached to a fuel intake port (36) of fuel pump (20). Suction filter (40) may have a sheet-shaped filter body (38) and an attaching member (29). Filter body (38) has an internal filter structure (40a, 40b), and attaching member (29) attaches filter body (38) to fuel intake port (36) such that internal filter structure (40a, 40b) communicates with fuel intake port (36). Filter body (38) may be folded over to form a multi-layered structure comprising an upper filter layer (38a) and a lower filter layer (38b). Folding over the sheet-shaped filter body (38) allows a filtration area of fuel supply device (10) to be increased while preventing an increase in the size of fuel supply device (10).

9 Claims, 5 Drawing Sheets

FUEL SUPPLY DEVICE

CROSS REFERENCE

This application claims priority to Japanese Patent application number 2004-128951, filed on Apr. 23, 2004, the contents of which are hereby incorporated by reference as if fully set forth herein.

BACKGROUND OF THE INVENTION

1. Field of the Invention

The present invention relates to a fuel supply device for supplying fuel from a fuel tank to an internal combustion engine (e.g., an engine for a motor vehicle). Specifically, it relates to the improvement of a suction filter attached to a fuel intake side of the fuel supply device.

2. Description of the Related Art

Japanese Laid-open Patent Publication No. 2002-250257 describes a fuel supply device for supplying fuel from a fuel tank to an internal combustion engine. This fuel supply device is provided with a fuel pump disposed within the fuel tank. A suction filter is connected to a fuel intake port of the fuel pump. The suction filter is disposed in an approximate ring shape along an outer periphery of the fuel pump. The fuel within the fuel tank is drawn into the fuel pump after foreign matter has been removed therefrom by the suction filter.

SUMMARY OF THE INVENTION

In this type of fuel supply device, an increasing quantity of foreign matter adheres to the suction filter as the period of use increases. As a result, the suction filter must be replaced after a prescribed period of use. Thus, there is a demand for increasing the filtration area of the suction filter so that a longer time can elapse before the filter must be replaced (i.e., filter life is increased).

However, increasing the filtration area of the suction filter increases the size of the suction filter, and it can not be mounted as easily on the fuel tank. In particular, in the case where the suction filter is disposed in an approximate ring shape along an outer periphery of the fuel pump, the fuel supply device becomes larger in a radial direction if the filtration area of the suction filter is increased.

Accordingly, it is one object of the present teachings to provide a fuel supply device in which the filtration area of a suction filter is increased without increasing the size of the fuel supply device.

In one aspect of the present teachings, a fuel supply device may comprise a fuel pump and a suction filter that is attached to a fuel intake port of the fuel pump. The suction filter may include a sheet-shaped filter body which has an internal filter structure. The suction filter may further include an attaching member that attaches the filter body to the fuel intake port such that the internal filter structure of the filter body communicates with the fuel intake port. The filter body may be folded over to form a multi-layered structure. Therefore, it is possible to save a great deal of space compared to the case where the suction filter is disposed in a ring shape around an outer periphery of a fuel pump. In the case, for example, where the filter body is folded over once to form a two-layered structure, a filtration area is obtained that is approximately double that of a one-layered structure having an identical plane area. Furthermore, the sheet-shaped filter body is thin, and consequently there is not an increase in thickness even though the filter body is folded over. As a result, this fuel supply device allows an increase in the filtration area of the suction filter while preventing an increase in size.

It is preferred that the suction filter is further provided with a bypassing passage being arranged such that fuel is adapted to directly flow from a first layer of the multi-layered structure via a hollow portion to a second layer of the multi-layered structure, thereby bypassing the internal filter structure of the filter body there between. It is thus easy for the fuel to flow towards the intake port from each layer of the multi-layered structure, and consequently pressure loss caused by the suction filter can be kept low.

In another aspect of the present teachings, the fuel supply device may further have a pump casing for housing the fuel pump. In this case, it is preferred that the pump casing engages with the attaching member, and the fuel pump is thus held within the pump casing. With this type of structure, there is no need to provide a part for supporting the fuel pump in the pump casing, and the shape of the pump casing can thus be simplified.

The attaching member may comprise a supporting part, an outer cylinder, and a resilient body. The supporting part supports the fuel pump. The outer cylinder is disposed along an outer periphery of the supporting part, and engages with the pump casing. The resilient body joins the supporting part and the outer cylinder. With this type of structure, the supporting part that supports the fuel pump, and the outer cylinder that engages with the pump casing, are each formed separately and are joined by the resilient body. As a result, vibration of the fuel pump is not readily transmitted to the outer cylinder. This prevents the engaged state of the outer cylinder and the pump casing from being released by the vibration of the fuel pump.

In another aspect of the present teachings, the fuel pump may include an air removal port that is arranged to discharge air within the fuel pump to the exterior. The air removal port may be located in a face of the fuel pump at the fuel intake port side. The supporting part of the attaching member may have a fuel passage and an air removal passage. The fuel passage joins the fuel intake port and the internal filter structure of the filter body. The air removal passage is connected with the air removal port. In this case, it is preferred that an air discharge port end of the air removal passage is approximately parallel with respect to a longitudinal direction of the filter body. With this type of structure, the air discharged from the fuel pump is discharged in a direction approximately parallel with respect to a longitudinal direction of the filter body. As a result, the discharged air is not readily drawn into the filter body (i.e., into the fuel pump).

Further, the attaching member may further include an air removal pipe having one end connected with the air discharge port end of the air removal passage. The air removal pipe preferably extends approximately perpendicularly towards the exterior from an outer wall face of the supporting part, and the air removal pipe extends such that it does not make contact with the outer cylinder. With this type of structure, the air is discharged from the fuel pump via the air removal pipe that extends, in an approximately perpendicular manner, towards the exterior from the supporting part. As a result, the speed of the discharged air is increased in the perpendicular direction, thus better preventing the discharged air from being drawn back into the fuel pump. Further, the air removal pipe and the outer cylinder do not make contact, and this prevents the vibration of the fuel pump from being transmitted to the outer cylinder via the air removal pipe.

The length of the air removal pipe can be determined as required. For example, the air removal pipe may have a length such that its tip is at an inner side of the outer cylinder, or may have a length such that its tip is within the body of the outer cylinder. Alternatively, the air removal pipe may have a length such that its tip protrudes to the exterior from the outer cylinder.

These aspects and features may be utilized singularly or, in combination, in order to make improved fuel supply device. In addition, other objects, features and advantages of the present teachings will be readily understood after reading the following detailed description together with the accompanying drawings and claims. Of course, the additional features and aspects disclosed herein also may be utilized singularly or, in combination with the above-described aspect and features.

DETAILED DESCRIPTION OF THE INVENTION

Fuel supply device 10 according to a representative embodiment of the present teachings will be explained below with reference to the drawings. Fuel supply device 10 may be disposed within a fuel tank, pump up fuel from within the fuel tank, and discharge this fuel to the exterior of the fuel tank.

Figure 1:
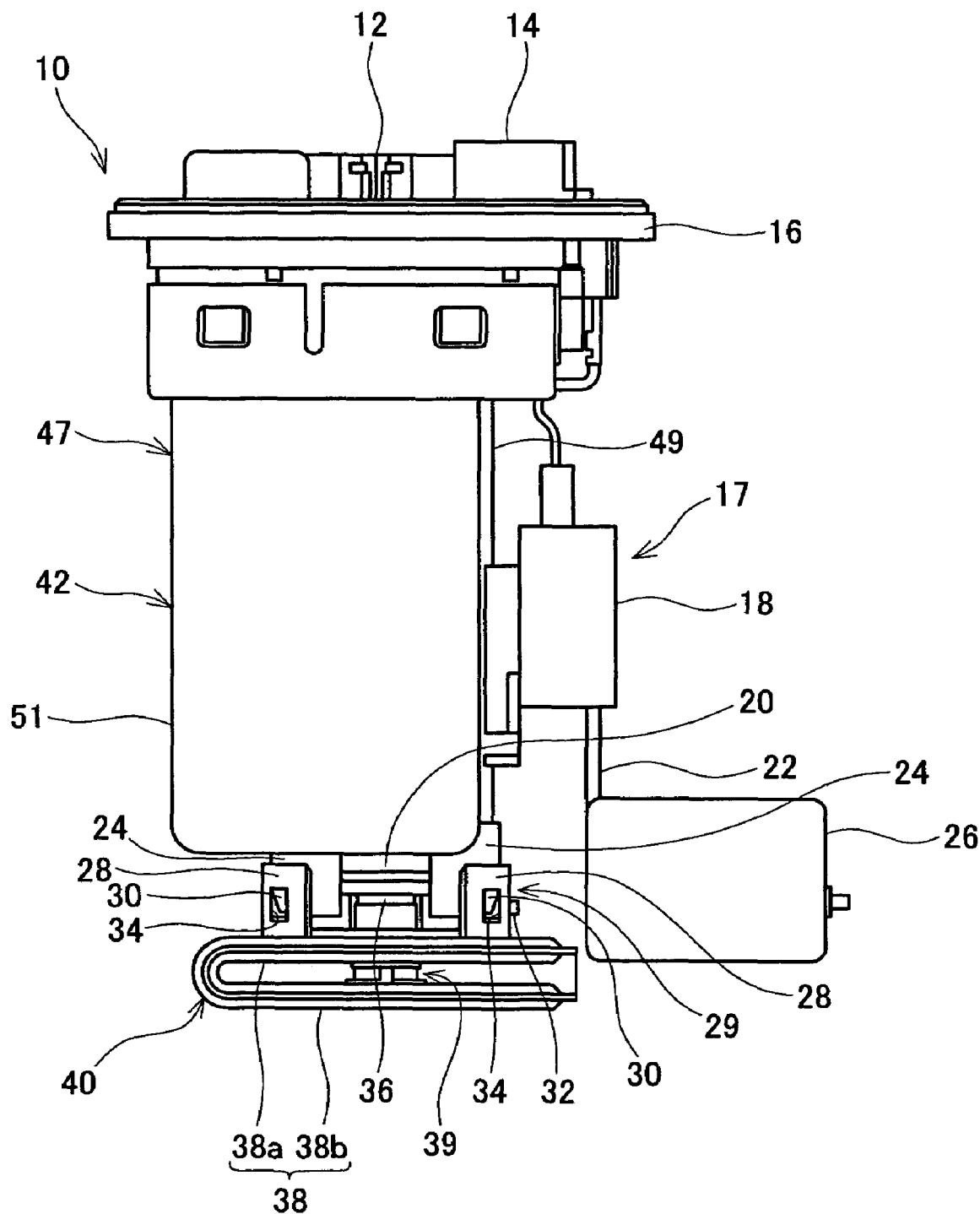
FIG. 1 is a side view showing the entirety of a fuel supply device according to a representative embodiment of the present teachings.

As shown in FIG. 1, fuel supply device 10 has a housing 42 formed from resin. Housing 42 comprises a flange part 16 and a casing part 47 that is joined with flange part 16. Flange part 16 may be attached to a fuel tank (not shown). Outer connector 14 and a discharge pipe attaching part 12 are formed on an upper face of flange part 16. Outer connector 14 may be connected with a power supply (not shown). Power from the power supply is supplied to fuel supply device 10 via outer connector 14. A discharge pipe (not shown) may be attached to discharge pipe attaching part 12. An injector may be connected to the other end of the discharge pipe. The injector injects fuel to an engine.

Casing part 47 has a filter casing 51 and a pump casing 49. Filter casing 51 houses a fuel filter (not shown), and pump casing 49 houses a fuel pump 20. A plurality of joining pieces 24 are formed at a lower end of pump casing 49. Suction filter 40 is attached to pump casing 49 by means of joining pieces 24.

Fuel supply device 10 may further include level gauge 17. Level gauge 17 has a float 26, an arm 22, and a sensor 18. Sensor 18 is attached, in a manner allowing removal, to flange part 16. Float 26 rises or falls as the quantity of fuel in the fuel tank changes. When float 26 rises or falls, the angle of arm 22 changes, and sensor 18 detects this change in angle of arm 22. By this means, the quantity of fuel in the fuel tank is measured.

A detailed description will be given, with reference to FIGS. 2 to 5, of suction filter 40 attached to the lower end of pump casing 49. As shown in FIGS. 2 to 5, suction filter 40 comprises filter body 38 (38a and 38b), and attaching member 29 that attaches filter body 38 to pump casing 49. Filter body 38 is formed in a sheet shape that has a predetermined thickness. Filter body 38 may comprise a filter bag and a frame (not shown). The filter bag may be formed in a bag shape from filter material (e.g., unwoven cloth), and the frame may be disposed within the filter bag.

Figure 2:
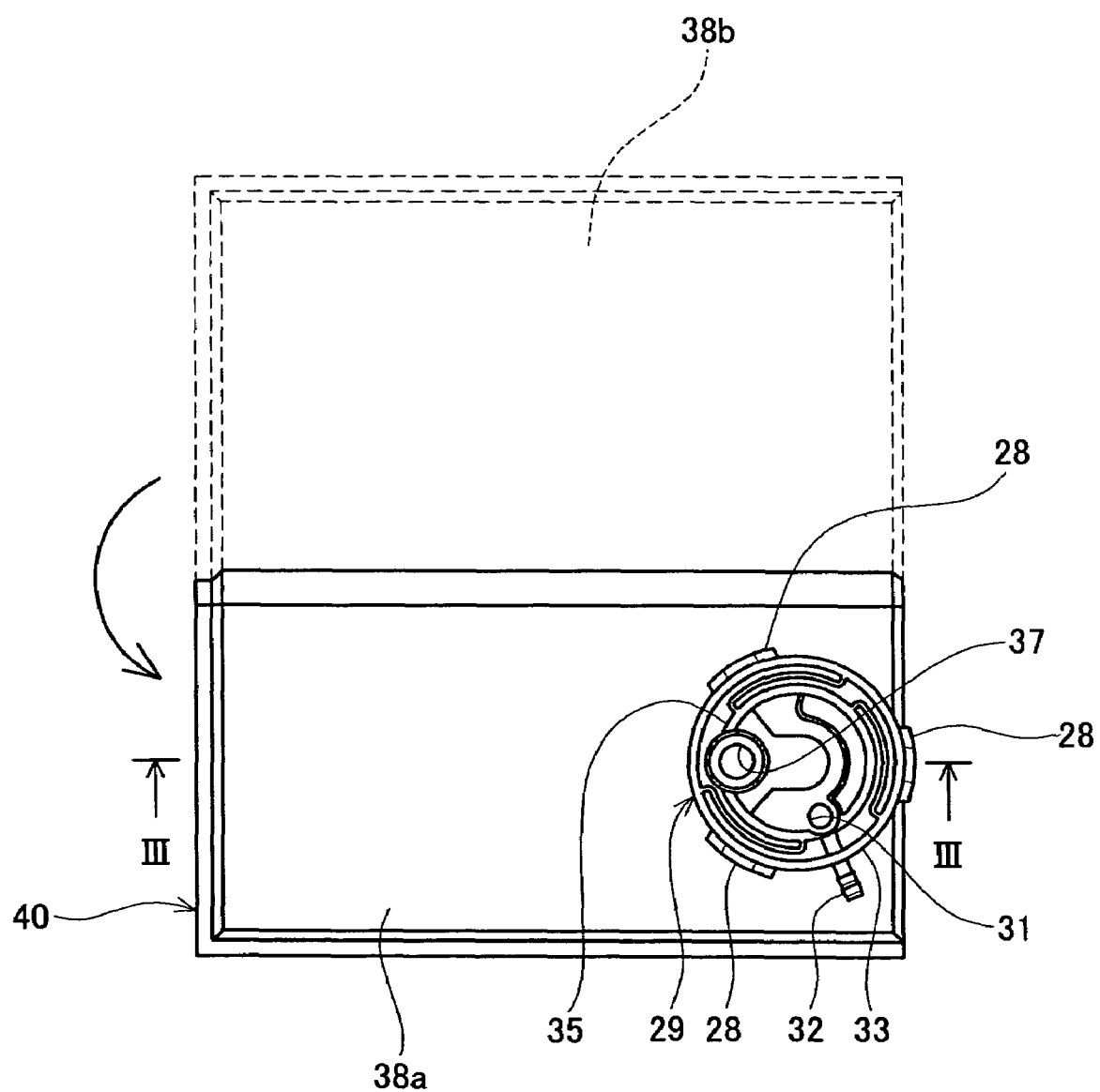
FIG. 2 is a plan view of a suction filter of the representative embodiment.
Figure 3:
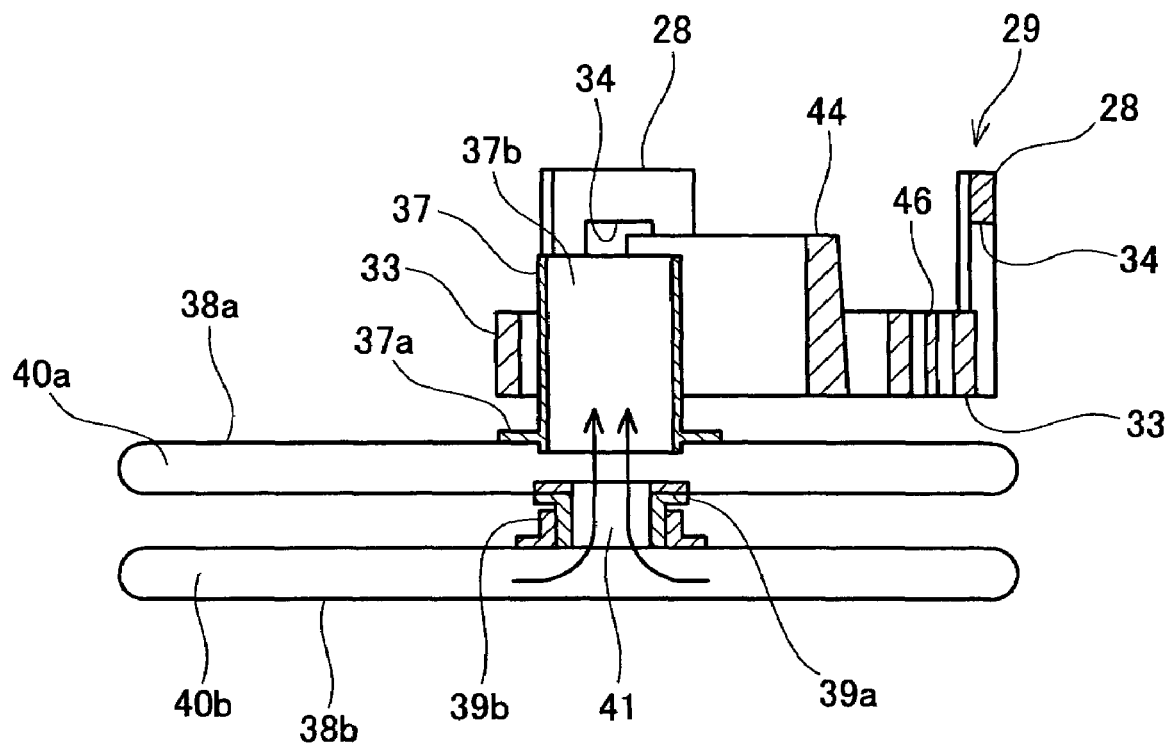
FIG. 3 is a cross-sectional view along the line III-III of FIG. 2.

As shown in FIGS. 2 and 3, the sheet-shaped filter body 38 is folded over at its center to form a two-layered structure comprising an upper filter layer 38a and a lower filter layer 38b. As is clear from FIG. 3, a joining member 39a is fixed to a lower face of the upper filter layer 38a, and a joining member 39b is fixed to an upper face of the lower filter layer 38b. The upper filter layer 38a and the lower filter layer 38b are joined by engaging the joining member 39a with the joining member 39b. Bypassing passage 41 is formed in the joining member 39a. Bypassing passage 41 communicates an inner space (internal filter structure) 40b of lower filter layer 38b and an inner space (internal filter structure) 40a of upper filter layer 38a. Fuel that has been taken into lower filter layer 38b can flow through bypassing passage 41 into the inner space 40a of upper filter layer 38a.

Attaching member 29 is fixed to an upper face of upper filter layer 38a. As is clear from FIG. 5, attaching member 29 has an inner cylinder 35 and an outer cylinder 33. Inner cylinder 35 makes contact with a lower face of fuel pump 20, and supports fuel pump 20. Outer cylinder 33 is disposed along an outer side of inner cylinder 35, and engages with pump casing 49. A space is formed between inner cylinder 35 and outer cylinder 33, and inner cylinder 35 and outer cylinder 33 are joined by three resilient bodies 46. As a result, vibration transmitted to inner cylinder 35 from fuel pump 20 is absorbed by the deformation of resilient bodies 46, and is not readily transmitted to outer cylinder 33.

A fuel passage part 37 and a supporting part 44 are formed within the inner cylinder 35. Supporting part 44 makes contact with the lower face of fuel pump 20. As shown in FIG. 3, a lower end 37a of fuel passage part 37 is fixed to the upper face of the upper filter layer 38a, and extends to the inner space 40a of upper filter layer 38a. Further, an upper end of the fuel passage part 37 makes contact with fuel intake port 36 of fuel pump 20 (see FIG. 1). As a result, the inner space 40a of upper filter layer 38a communicates with fuel intake port 36 of fuel pump 20 via a fuel passage 37b formed in fuel passage part 37. Moreover, fuel passage 37b is adjusted so as to be in the same location as bypassing passage 41 of joining member 39a. The fuel within lower filter layer 38b can thus easily flow into fuel pump 20.

Figure 4:
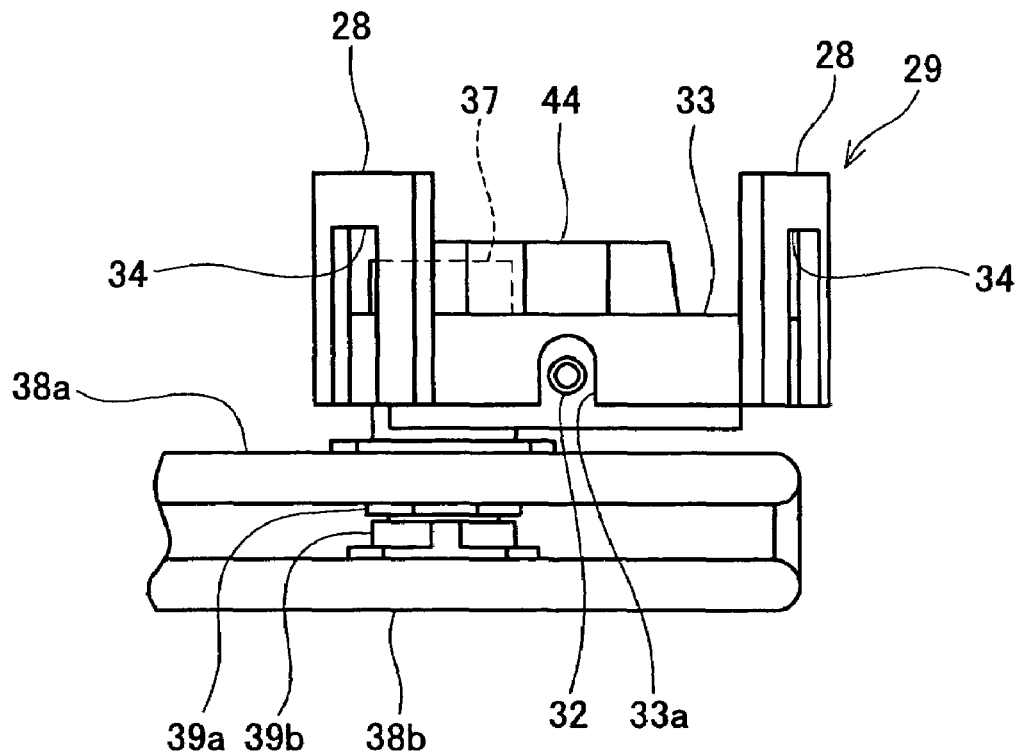
FIG. 4 is an enlarged side view showing an attaching member of the suction filter.

An upper face of supporting part 44 of inner cylinder 35 protrudes further upwards than an upper end of fuel passage part 37, and makes contact with a lower face of fuel pump 20 (see FIGS. 3 and 4). As shown clearly in FIG. 5, air removal passage 31 is formed in supporting part 44. An upper end of air removal passage 31 is connected with an air removal port (not shown) formed in the lower face of fuel pump 20. Furthermore, a lower end of air removal passage 31 is connected with air removal pipe 32 that protrudes to the outer side from the inner cylinder 35. Air removal pipe 32 protrudes to the outer side of outer cylinder 33 through a groove 33a (see FIG. 4) formed in outer cylinder 33.

Consequently, an air discharge port of air removal pipe 32 is at a position removed from the outer side of outer cylinder 33. As a result, air within fuel pump 20 flows from the air removal port of fuel pump 20 into air removal passage 31, and is discharged sideways by air removal pipe 32 at a position removed from outer cylinder 33. The air discharged from air removal pipe 32 is thus prevented from again being drawn from suction filter 40 into fuel pump 20. Further, groove 33a formed in outer cylinder 33 prevents air removal pipe 32 from making contact with outer cylinder 33. As a result, air removal pipe 32 does not transmit vibration from fuel pump 20 to outer cylinder 33.

Figure 5:
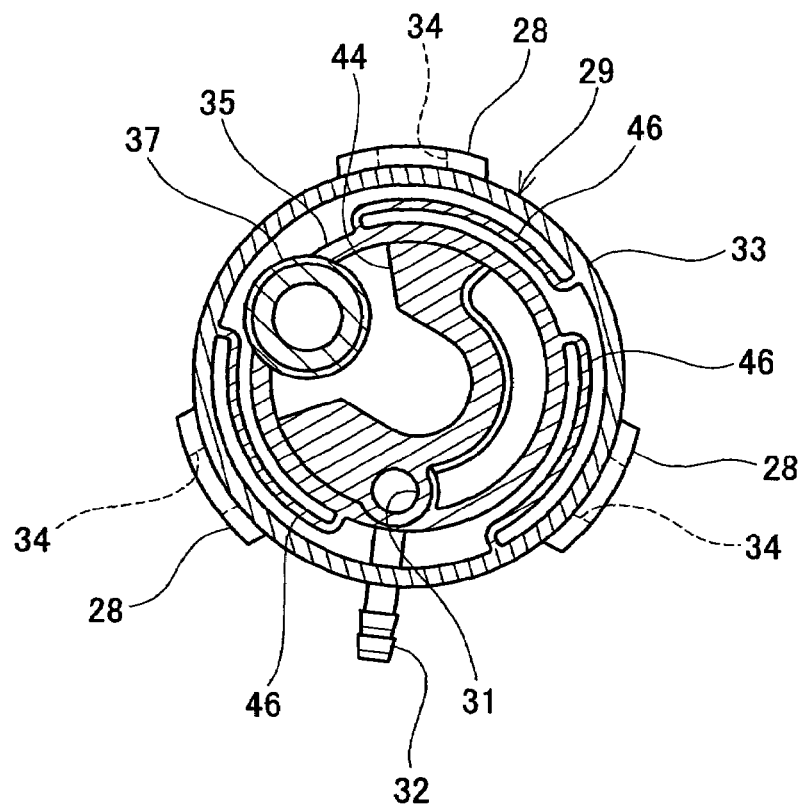
FIG. 5 is a plan view of the attaching member of the suction filter.

Three joining pieces 28 are formed equidistantly along a circumference direction of an outer periphery of outer cylinder 33 (see FIG. 5). A through hole 34 is formed in each joining piece 28. Protrusions 30 of joining pieces 24 formed at the lower end of pump casing 49 engage with through holes 34 (see FIG. 1). Pump casing 49 and attaching member 29 are firmly joined together by this means. Consequently, pump casing 49 and the attaching member 29 remain joined even if pressure from the fuel discharge side of fuel pump 20 exerts downwards force on attaching member 29. Fuel pump 20 is thus prevented from being removed from pump casing 49.

When fuel pump 20 operates, the fuel within the fuel tank is drawn inwards from an outer side of the filter body 38. At this juncture, comparatively large foreign matter contained in the fuel is removed by a filter member of an outer face of filter body 38. Furthermore, an outer shape of filter body 38 is maintained (i.e., filter members of an upper face and a lower face of filter body 38 do not adhere to one another) by the frame that is disposed therein, and the filtration area thereof is thus maintained.

The fuel flowing within filter body 38 flows along fuel passage part 37 of attaching member 29 that passes through the interior of filter body 38. At this juncture, a portion of the fuel that has been drawn into the lower filter layer 38b flows into the upper filter layer 38a via bypassing passage 41. As a result, both upper filter layer 38a and lower filter layer 38b draw in fuel satisfactorily.

The fuel that has flowed along fuel passage part 37 is taken, through fuel passage 37b, into fuel pump 20 from fuel intake port 36. The fuel that has been taken into fuel pump 20 is pressurized by fuel pump 20, and flows into the fuel filter. Minute foreign matter contained in the fuel is removed in the fuel filter. A pressure regulator (not shown) adjusts the pressure of the fuel that has passed through the fuel filter, and then the fuel is discharged from the discharge pipe to the exterior of fuel supply device 10.

As is clear from the above description, fuel supply device 10 uses a suction filter 40 having a multi-layered structure in which the sheet-shaped filter body 38 is folded over. Consequently, since filter body 38 is folded over, the plane area of suction filter 49 (its area in a plane direction) does not increase even if the area of filter body 38 (i.e., its filtration area) is increased. Further, the sheet-shaped filter body 38 is thin and consequently it does not become large, in its direction of thickness, even when folded over. It is thus possible to save space while increasing the filtration area.

Furthermore, in the two-layered structure having the sheet-shaped filter body folded over to have upper filter layer 38a and lower filter layer 38b, bypassing passage 41 joins upper filter layer 38a and lower filter layer 38b. It is therefore easy for the fuel to flow from lower filter layer 38b into fuel intake port 36 of fuel pump 20, and the fuel can be drawn from the entirety of upper filter layer 38a and lower filter layer 38b.

The embodiment described above is a fuel supply device in which the fuel pump is disposed vertically within the fuel tank. However, the present teachings can also be applied to a fuel supply device in which a fuel pump is disposed horizontally within the fuel tank.

Figure 6:
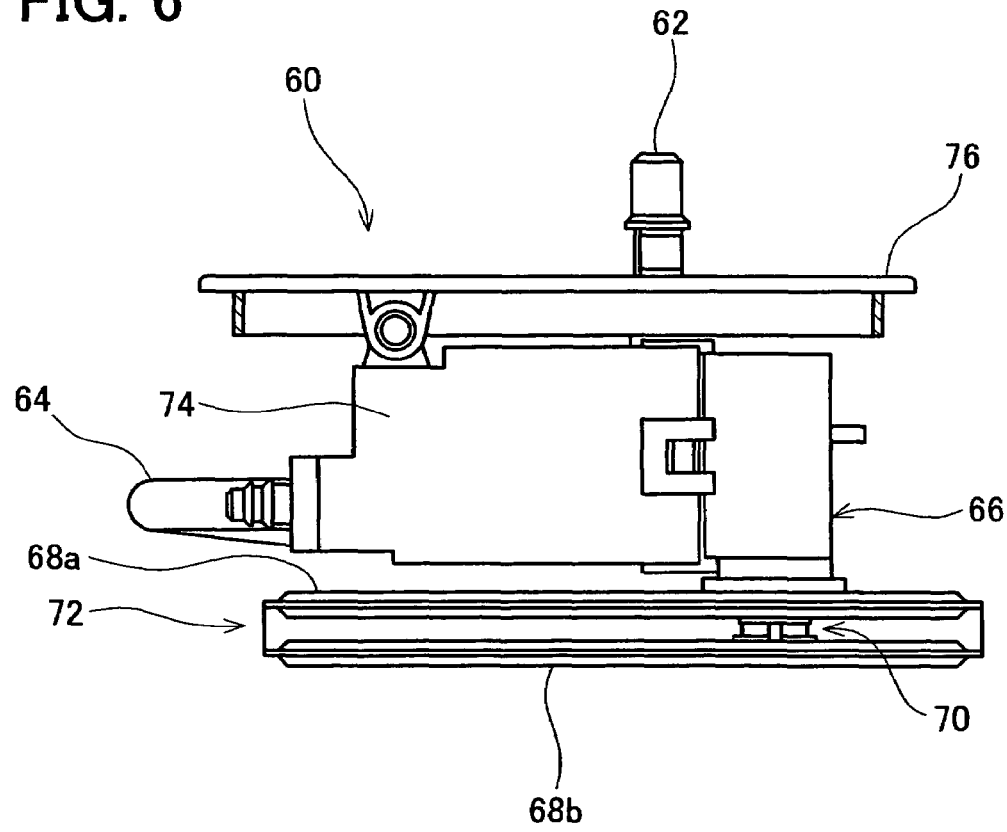
FIG. 6 is a front view of a fuel supply device according to a different representative embodiment of the present teachings.
Figure 7:
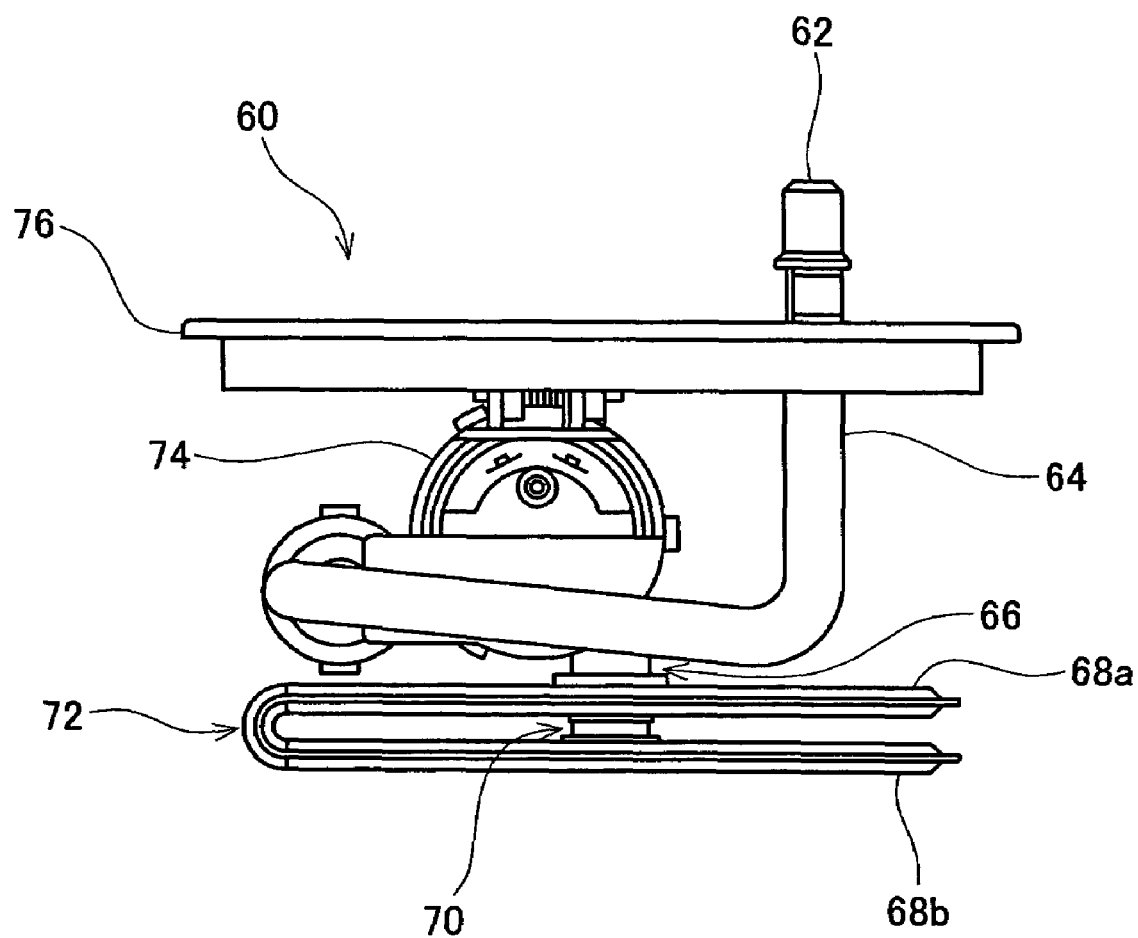
FIG. 7 is a side view of the fuel supply device shown in FIG. 6.

Fuel supply device 60 shown in FIGS. 6 and 7 is provided with a flange 76 fixed to a fuel tank (not shown). A discharge pipe attaching part 62 is formed on an upper face of flange 76. Fuel pump 74 is fixed in a horizontal direction to a lower face of flange 76. As shown in FIG. 6, one end of a fuel pipe 64 joins with a fuel discharging side (the left side in the figure) of fuel pump 74. The other end of fuel pipe 64 is connected with the discharge pipe attaching part 62 of flange 76.

An attaching member 66 of suction filter 72 is attached to a fuel intake side (the right side in the figure) of fuel pump 74. Suction filter 72 is a two-layered structure (an upper filter layer 68a and a lower filter layer 68b) formed by folding over a sheet-shaped filter body. The upper filter layer 68a and the lower filter layer 68b are joined by a joining member 70. Fuel that is taken into the lower filter layer 68b flows into the upper filter layer 68a via the joining member 70. The attaching member 66 is fixed to the upper filter layer 68a. In this fuel supply device 60, also, suction filter 72 is a two-layered structure formed by folding over a sheet-shaped filter body 68. Consequently, it is possible to save space while increasing the filtration area. Further, the fuel pump 74 is disposed horizontally, and consequently the height of fuel supply device 60 can be reduced greatly. It can thus be provided in low, flat fuel tanks.

In the representative embodiments described above, the present teachings were applied to a fuel supply device having a fuel pump integrated therewith. However, the present teachings are not limited to this type. For example, the present teachings can also be applied to a fuel supply device having a sub-tank (i.e., a fuel supply device in which a suction filter is disposed at a base part within the sub-tank).

Furthermore, the above embodiments described a case in which the filter body was rectangular. However, the shape of the filter body is not restricted to a rectangle, but can also be, for example, a circle, a polyhedron, or any other shape.

Moreover, the number of folds of the filter body is not restricted to one fold, but can be any number of two or more or folds. It is preferred that, in the case where the filter member is folded over two or more times, the number of bypassing passages that join adjoining (opposing) layers increases as the distance from a fuel supply port grows.

Further, a filter body having a folded over multi-layered structure may also be bent and located along an inner surface of the fuel tank.

Finally, although the preferred representative embodiment has been described in detail, the present embodiment is for illustrative purpose only and not restrictive. It is to be understood that various changes and modifications may be made without departing from the spirit or scope of the appended claims. In addition, the additional features and aspects disclosed herein also may be utilized singularly or in combination with the above aspects and features.

The invention claimed is:

1. A fuel supply device, comprising:
a fuel pump, and
a suction filter attached to a fuel intake port of the fuel pump, wherein the suction filter comprises a sheet-shaped filter body having an inner space, a bypassing passage, and an attaching member attaching the filter body to the fuel intake port of the fuel pump such that the inner space of the filter body communicates with the fuel intake port, wherein the filter body is folded such that a plurality of filter layers with respective inner spaces is formed, and wherein the bypassing passage directly communicates the inner space of a filter layer distant from the fuel intake port and the inner space of a filter layer being near to the fuel intake port.

2. The fuel supply device as in claim 1, the fuel supply device further comprising a pump casing for housing the fuel pump, wherein the fuel pump is held within the pump casing by engagement of the pump casing and the attaching member.

3. The fuel supply device as in claim 1, wherein the attaching member is provided with a supporting part, an outer cylinder, and a resilient body, the supporting part supporting the fuel pump, the outer cylinder being disposed along an outer periphery of the supporting part and engaging with the pump casing, and the resilient body joining the supporting part and the outer cylinder.

4. The fuel supply device as in claim 3, wherein the fuel pump is provided with an air removal port located in a face of the fuel pump at a side having the fuel intake port, the air removal port is arranged to discharge air present in the fuel pump; and the supporting part of the attaching member is provided with a fuel passage and an air removal passage, the fuel passage joining the fuel intake port and the inner space of the filter body, and the air removal passage being connected with the air removal port, and wherein an air discharge port end of the air removal passage is approximately parallel with respect to a longitudinal direction of the filter body.

5. The fuel supply device as in claim 4, wherein the attaching member is further provided with an air removal pipe having one end connected with the air discharge port end of the air removal passage, the air removal pipe extending approximately perpendicularly towards an outer side from an outer wall face of the supporting part, and the air removal pipe extending so as not to make contact with an outer cylinder.

6. A suction filter, comprising:
   a sheet-shaped filter body having an inner space, wherein the filter body is folded such that a plurality of filter layers with respective inner spaces is formed,
   an attaching member attaching the filter body to a fuel intake port of a fuel pump such that the inner space of the filter body communicates with the fuel intake port; and a bypassing passage for directly communicating the inner space of a filter layer being distant from the fuel intake port and the inner space of a filter layer being near to the fuel intake port.

7. A fuel supply device, comprising:

a fuel pump, a suction filter attached to a fuel intake port of the fuel pump, wherein the suction filter comprises a sheet-shaped filter body having an internal filter structure, and an attaching member attaching the filter body to the fuel intake port of the fuel pump such that the internal filter structure communicates with the fuel intake port, wherein the filter body is folded over to form a multi-layered structure, and wherein the attaching member is provided with a supporting part, an outer cylinder, and a resilient body, the supporting part supporting the fuel pump, the outer cylinder being disposed along an outer periphery of the supporting part and engaging with the pump casing, and the resilient body joining the supporting part and the outer cylinder.

8. The fuel supply device as in claim 7, wherein the fuel pump is provided with an air removal port located in a face of the fuel pump at a side having the fuel intake port, the air removal port is arranged to discharge air present in the fuel pump; and the supporting part of the attaching member is provided with a fuel passage and an air removal passage, the fuel passage joining the fuel intake port and the internal filter structure of the filter body, and the air removal passage being connected with the air removal port, and wherein an air discharge port end of the air removal passage is approximately parallel with respect to a longitudinal direction of the filter body.

9. The fuel supply device as in claim 8, wherein the attaching member is further provided with an air removal pipe having one end connected with the air discharge port end of the air removal passage, the air removal pipe extending approximately perpendicularly towards an outer side from an outer wall face of the supporting part, and the air removal pipe extending so as not to mack contact with an outer cylinder.

* * * * *